(12) United States Patent
Kinoshita

(10) Patent No.: US 7,340,580 B2
(45) Date of Patent: Mar. 4, 2008

(54) STORAGE DEVICE AND INFORMATION PROCESSING SYSTEM

(75) Inventor: Tadaaki Kinoshita, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 261 days.

(21) Appl. No.: 11/199,239

(22) Filed: Aug. 9, 2005

(65) Prior Publication Data

US 2005/0270877 A1 Dec. 8, 2005

Related U.S. Application Data

(63) Continuation of application No. PCT/JP2004/018892, filed on Dec. 17, 2004.

(30) Foreign Application Priority Data

Dec. 25, 2003 (JP) .............................. 2003-431034

(51) Int. Cl.
*G06F 12/00* (2006.01)

(52) U.S. Cl. ...................... 711/173; 711/103; 711/154; 711/170

(58) Field of Classification Search ..................... None
See application file for complete search history.

(56) References Cited

U.S. PATENT DOCUMENTS 6,148,377 A * 11/2000 Carter et al. ................. 711/147

6,484,250 B1 * 11/2002 Mei et al. .................... 711/216

FOREIGN PATENT DOCUMENTS

| JP | 60245029 | * | 9/1985 |
|----|----------|---|--------|
| JP | 60-245029 | | 12/1985 |
| JP | 09-244818 | | 9/1987 |
| JP | 05-019981 | | 1/1993 |
| JP | 06-274251 | | 9/1994 |
| JP | 06274251 | * | 9/1994 |
| JP | 06-282386 | | 10/1994 |
| JP | 06-314177 | | 11/1994 |

OTHER PUBLICATIONS

Microsoft Press, Microsoft Computer Dictionary, 2002, Microsoft Press, Fifth Edition, p. 216.*
International Search Report dated Apr. 5, 2005 for PCT/JP2004/018892 Filed Dec. 17, 2004.

* cited by examiner

*Primary Examiner*—Mano Padmanabhan
*Assistant Examiner*—Shawn Gu
(74) *Attorney, Agent, or Firm*—Pillsbury Winthrop Shaw Pittman, LLP

(57) ABSTRACT

A storage device includes a data-readable/writable storage medium, a data-readable/writable nonvolatile memory, and a controller which manages one of respective physical storage areas of the storage medium and the nonvolatile memory as being a logical storage area and which, in response to an access request from an external source, executes access to either one or both of the storage medium and the nonvolatile memory.

12 Claims, 8 Drawing Sheets

| Index | Logical start sector address | Logical end sector address | Nonvolatile-memory logical start sector address | Nonvolatile-memory logical end sector address | Redundancy | Valid / invalid |
|---|---|---|---|---|---|---|
| 00h | 0000010000h | 000001FFFFh | 0000000000h | 000000FFFFh | 0 | 1 |
| 01h | 0000040000h | 000005FFFFh | 0000020000h | 000003FFFFh | 0 | 1 |
| 02h | 0000000020h | 000000002Fh | 0000040020h | 000004002Fh | 0 | 1 |
| 03h | 0000000001h | 0000000001h | 0000040031h | 0000040031h | 1 | 1 |
| ... | ... | ... | ... | ... | ... | ... |
| 07h | Fxxxxxxxxh | 0000000000h | xxxxxxxxxh | xxxxxxxxxh | 0 | 0 |
| ... | ... | ... | ... | ... | ... | ... |
| FFh | xxxxxxxxxh | xxxxxxxxxh | xxxxxxxxxh | xxxxxxxxxh | 0 | 0 |

F I G. 3

STORAGE DEVICE AND INFORMATION PROCESSING SYSTEM

CROSS REFERENCE TO RELATED APPLICATIONS

This is a Continuation Application of PCT Application No. PCT/JP2004/018892, filed Dec. 17, 2004, which was published under PCT Article 21(2) in Japanese.

This application is based upon and claims the benefit of priority from prior Japanese Patent Application No. 2003-431034, filed Dec. 25, 2003, the entire contents of which are incorporated herein by reference.

BACKGROUND OF THE INVENTION

1. Field of the Invention

The present invention relates to a storage device having a data-readable/writable storage medium and to an information processing system.

2. Description of the Related Art

Information processing apparatuses, such as personal computers and PDAs (personal digital assistants), generally have a storage device, such as an HDD (hard disk drive), for storing various items of data including, for example, file system and security data. Additionally, the apparatuses use demountable storage devices.

Various techniques have hitherto been proposed in the field of storage devices of the type described above. For example, Jpn. Pat. Appln. KOKAI Publication No. 6-282386 describes a highly reliable disk storage system. In the disk storage system, nonvolatile memories are used as cache memories for a magnetic disk, in which in the event of an apparatus reboot after failure occurrence resulted from, for example, a momentary mains-power failure, cache data stored in the nonvolatile memories are used to renew or update the content of data stored in a magnetic disk.

However, in disk storage systems of the type described above, while the storage capacity is relatively large, there arises a problem in that an average overhead time is increased due to delay time called "latency", seek time, or the like. In addition, there arises another problem in that the power consumption is high.

Under these circumstances, the presentation is demanded for techniques that reduces the average overhead time and efficiently controls data.

BRIEF SUMMARY OF THE INVENTION

According to one aspect of the present invention, there is provided a storage device, comprising a data-readable/writable storage medium; a data-readable/writable nonvolatile memory; and a controller which manages one of respective physical storage areas of the storage medium and the nonvolatile memory as being a logical storage area and which, in response to an access request from an external source, executes access to either one or both of the storage medium and the nonvolatile memory.

According to another aspect of the present invention, there is provided an information processing system, comprising an information processing unit; and a storage device connectable to the information processing unit, the information processing unit being capable of making a data access request to the storage device, and the storage device including a data-readable/writable storage medium, a data-readable/writable nonvolatile memory, and a controller which manages one of respective physical storage areas of the storage medium and the nonvolatile memory as being a logical storage area and which, in response to the access request from the information processing unit, executes access to either one or both of the storage medium and the nonvolatile memory.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view showing an exemplary content of an address management table shown in FIG. 1;

DETAILED DESCRIPTION OF THE INVENTION

Embodiments of the present invention will be described below with reference to the drawings.

Figure 1:
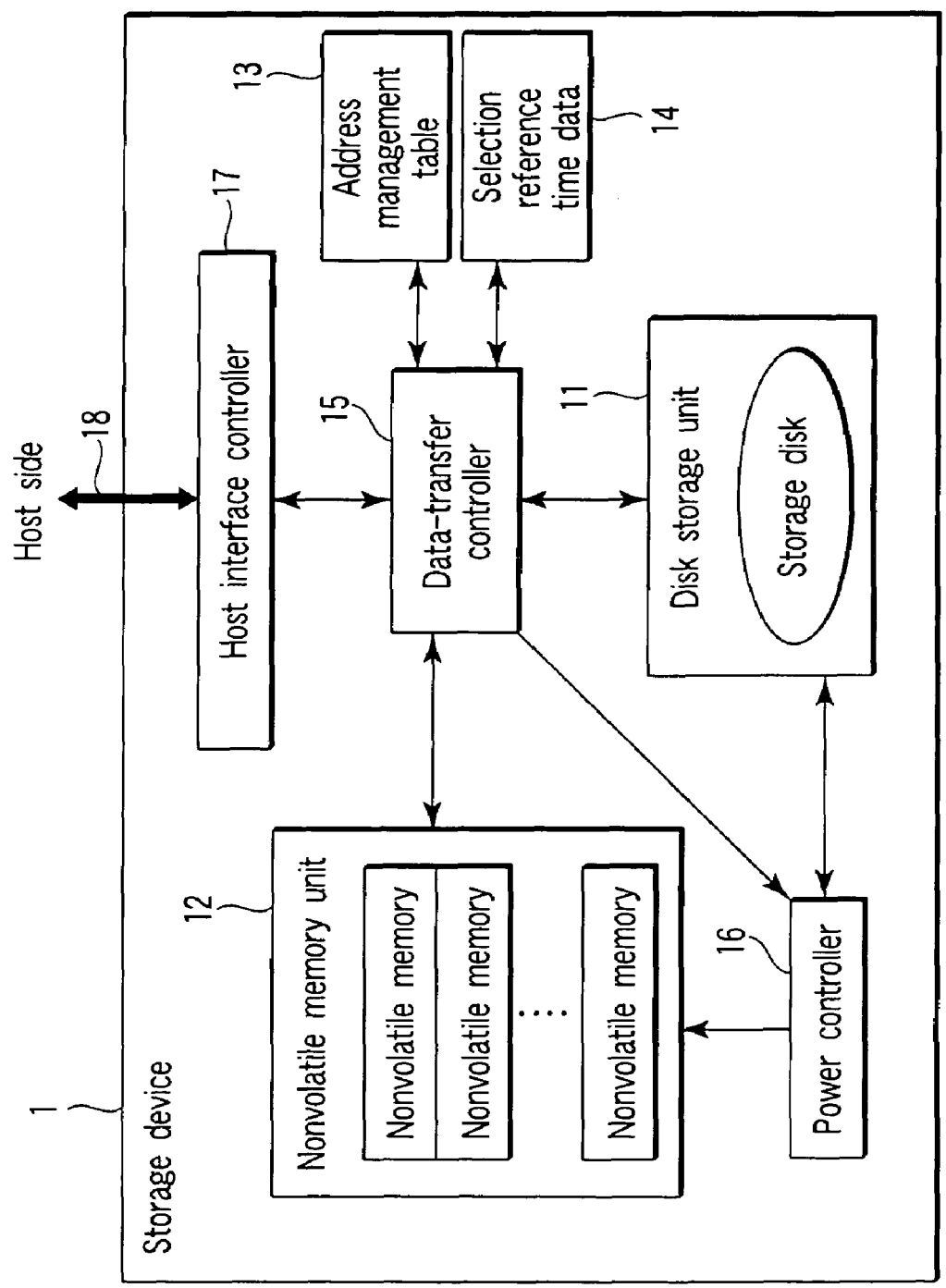
FIG. 1 is a block diagram showing a configuration of a storage device according to an embodiment of the present invention.

FIG. 1 is a block diagram showing a configuration of a storage device according to the embodiment of the invention.

A storage device 1 is a disk storage device having a data-readable/writable storage medium, and is implemented in the form of, for example, an HDD (hard disk drive) or a DVD (digital versatile disk) drive. The storage device 1 has a disk storage unit 11, a nonvolatile memory unit 12, an address management table 13, selection reference time data holding unit 14, a data-transfer controller 15, and a power controller 16.

The disk storage unit 11 is a device unit including a readable/writable storage disk, such as a magnetic disk or an optical disk, and executes data read/write by moving a head to a targeted sector on the storage disk. Various items of data are stored in the storage disk, including file system data such as FAT (file allocation table) data and security data.

The nonvolatile memory unit 12 is a device unit that includes multiple readable/writable nonvolatile memories (flash memories, for example) and executes data read/write on the nonvolatile memories.

The address management table 13 manages logical addresses corresponding to storage areas of the flash memories, and is used by the data-transfer controller 15. A detailed description of the address management table 13 is provided further below.

The selection reference time data holding unit 14 holds reference values that the data-transfer controller 15 uses when determining whether to write write-requested data to the disk storage unit 11. The reference values are used for comparison to head movement times (calculated values) in the disk storage unit 11.

The data-transfer controller 15 manages one of respective physical storage areas of the disk storage unit 11 (storage disk) and the nonvolatile memory unit 12 (multiple nonvolatile memories) as a logical storage area. Concurrently, in response to an access request (a write request or a read request, for example) from an external device, the data-transfer controller 15 accesses either one or both of the disk storage unit 11 (storage disk) and the nonvolatile memory unit 12 (multiple nonvolatile memories).

In addition, the data-transfer controller 15 is capable of determining which one of the disk storage unit 11 (storage disk) and the nonvolatile memory unit 12 (multiple nonvolatile memories) is to be accessed, by referring to the address management table 13. Further, when a write request for data has been issued from the host side, the data-transfer controller 15 responsively computes time necessary for executing write of the data to the storage disk in the disk storage unit 11. If the computation result is greater than or equal to a reference value being held by the selection reference time data holding unit 14, the data-transfer controller 15 determines to execute the write to a corresponding nonvolatile memory.

Further, as necessary (as in an event of failure such as a failure of the storage medium), the data-transfer controller 15 enables communication of data between the disk storage unit 11 (storage disk) and the nonvolatile memory unit 12 (multiple nonvolatile memories). Further, in execution of data transfer, the data-transfer controller 15 performs, for example, updating of information stored in the address management table 13.

Moreover, in the event of execution of access to one of the disk storage unit 11 (storage disk) and the nonvolatile memory unit 12 (multiple nonvolatile memories), the data-transfer controller 15 issues, prior to the execution, an instruction to the power controller 16 to supply power to an access-target device unit (one of the disk storage unit 11 and the nonvolatile memory unit 12). Further, upon termination of the execution of access, the data-transfer controller 15 issues an instruction to the power controller 16 to terminate power supply to the access-target device unit.

The power controller 16 realize power savings for operation in the storage device 1 by executing or termination power supply to the respective disk storage unit 11 and nonvolatile memory unit 12 in response to the instruction issued by the data-transfer controller 15. The arrangement may be such that control of the nonvolatile memory unit 12 is not executed, but only control of the disk storage unit 11 is executed. Even in this case, significant power savings can be implemented.

A host interface controller 17 performs an interface process for communication between the data-transfer controller 15 and host side device units through a bus 18. The bus 18 is used for connection between host side device units and the storage device 1 (host interface controller 17). For example, an access request is transferred from the host side to the storage device 1 side, and data is transferred from the storage device 1 side to the host side.

Figure 2:
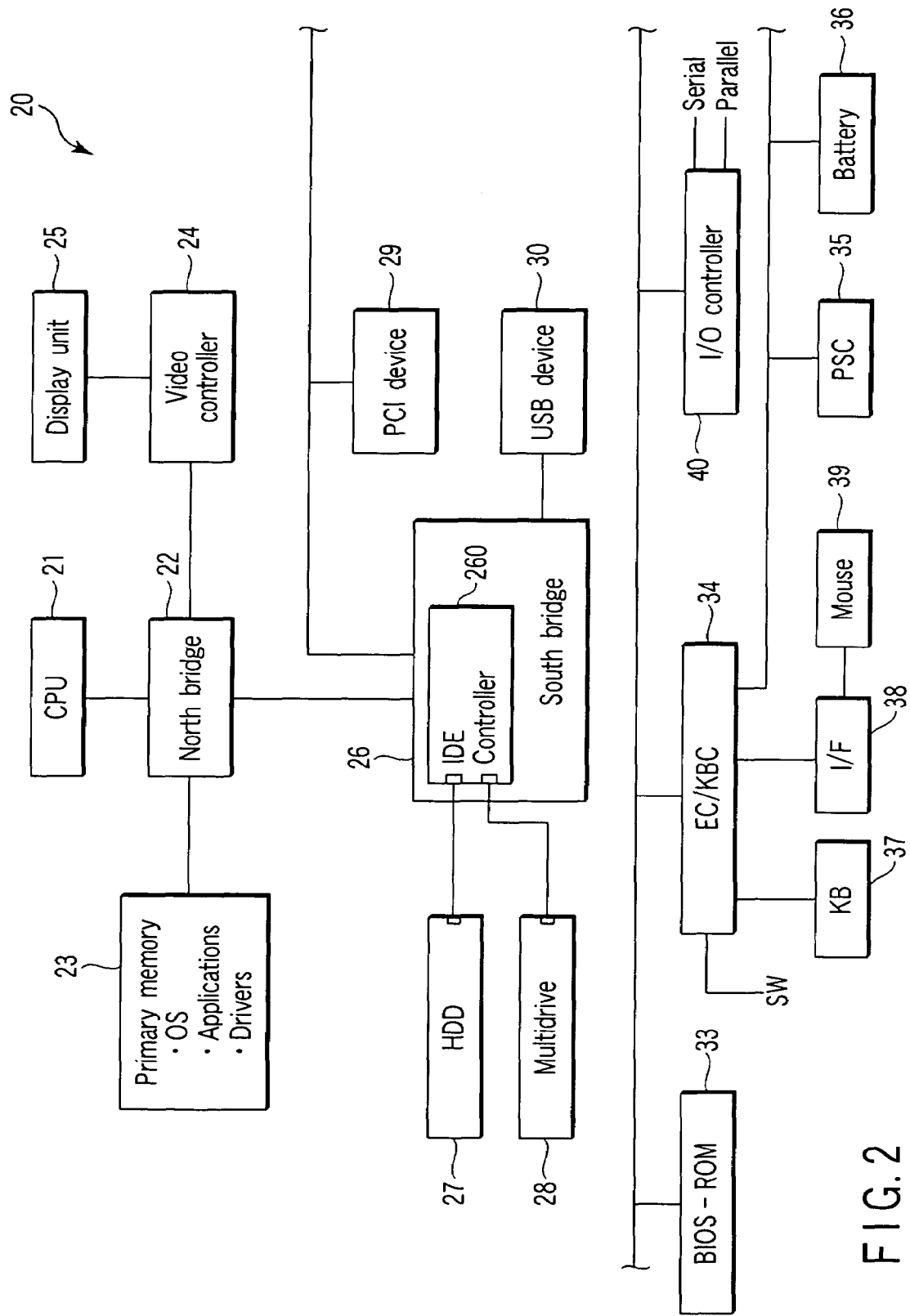
FIG. 2 is a block diagram showing a configuration of a host side information processing apparatus to which the storage device is connected.

FIG. 2 is a block diagram showing a configuration of a host side information processing apparatus to which the storage device 1 is connected. In the configuration, the storage device 1 corresponds to an HDD 27 (or a multi-drive 28) shown in FIG. 2.

The information processing unit 20 is a portable personal computer ("PC") or PDA. The information processing apparatus 20 has, for example, a CPU (central processing unit) 21, a North bridge 22, a primary memory 23, a video controller 24, a display unit 25, a South bridge 26, the HDD 27, the multi-drive 28, a PCI (peripheral components interconnect) device 29, a USB (universal serial bus) device 30, a BIOS-ROM (basic input/output system ROM) 33, an EC/KBC (embedded controller/keyboard controller) 34, a power supply controller 35 ("PSC"), a battery 36, a keyboard 37 ("KB"), a mouse interface ("I/F") 38, a mouse 39, and an I/O controller 40.

The CPU 21 governs control of the overall PC and executes, for example, various application programs by using the primary memory 23 as a work area. For example, in response to an instruction from a user, the CPU 21 is capable of controlling information and the like to be displayed on the display unit 25 or controlling various information processes to be executed for the HDD 27 through the South bridge 26.

The North bridge 22 has various controllers that perform, for example, a bridge process between the CPU 21 and the South bridge 26, control of the primary memory 23, and control of the video controller 24.

The primary memory 23 retains an operating system ("OS") that is run by the CPU 21, various applications, and various drivers, and is provided to serve as a work area of the CPU 21.

The video controller 24 couples to the North bridge 22 through an AGP (accelerated graphics port), and performs control of data that is to be displayed on the display unit 25.

The display unit 25 displays data sent from the video controller 24 on a screen, and has an LCD (liquid crystal display).

The South bridge 26 is coupled to the North bridge 22 through a Hub-link, and have various controllers for controlling, for example, various devices (such as the EC/KBC 34 and I/O controllers) on an LPC (low pin count) bus; various devices PCI devices (such as the PCI device 29) on a PCI (peripheral components interconnect) bus, and the USB device 30; and an IDE controller 260 for controlling the HDD 27, which is compliant with IDE (integrated drive electronics), and the multi-drive 28.

In response to instructions received from, for example, the CPU 21, the IDE controller 260 executes processes, such as issuance of an access request for data to the HDD 27 and transfer of data acquired from the HDD 27 to a different device unit.

The HDD 27 as a device compliant with a primary IDE is connected to the South bridge 26, whereby an internal hard disk containing, for example, the OS and various programs, is driven.

The multi-drive 28 as a device compliant with a secondary IDE is connected to the South bridge 26, whereby a DVD-RAM, CD-RW, and the like, which are removal media, can be driven.

The BIOS-ROM 33 is connected to the LPC bus, and contains a BIOS that performs processes, such as setting processes, at a power on time for hardware in the PC.

The EC/KBC 34 is connected to the LPC bus, and performs, for example, detection of a power-on operation with a power switch ("SW") and control for input devices such as the power supply controller 35 and the keyboard 37. The EC/KBC 34 is formed into an integrated device unit from an EC (embedded controller) and a keyboard controller, which are built-in controllers.

The power supply controller 35 is connected to the EC/KBC 34 through an I²C bus, thereby to control voltages to be supplied to individual units inside the PC.

The battery 36 is used as a power source for power supply to individual units inside of the PC when external power supply is not unavailable as in the case of movement of the PC.

The keyboard 37 is connected to the EC/KBC 34, whereby input signals corresponding to individual key depression operations are sent to the KBC.

The mouse interface 38 functions as an interface of signals between the mouse 39 and the EC/KBC 34.

The mouse 39 is connected to the mouse interface 38 and is used to perform input operations through, for example, click operations.

The I/O controller 40 is connected to the LPC bus, and performs I/O control for communication of signals such as serial signals and parallel signals with external devices.

FIG. 3 is a view showing exemplary content of the address management table 13 shown in FIG. 1.

The address management table 13 is used to control logical addresses corresponding to storage areas of the nonvolatile memories located in the nonvolatile memory unit 12. By referring to the address management table 13, the data-transfer controller 15 is capable of determining which one of the disk storage unit 11 (storage disk) and the nonvolatile memory unit 12 (multiple nonvolatile memories) is to be accessed.

As shown in FIG. 3, the address management table 13 is provided with the fields of "Index", "Logical start sector address", "Logical end sector address", "Nonvolatile-memory logical start address", "Nonvolatile-memory logical end address", "Redundancy information", and "Valid/invalid information".

"Index" is a field to be referred to for data registered in the address management table 13. A row with a respective index being present is controlled by the data-transfer controller 15 to be addable (for registration) and deletable.

"Logical start sector address" and "Logical end sector address" are, respectively, indicative of a first address and an end address of a logical sector address area from the host side.

"Nonvolatile-memory logical start address" and "Nonvolatile-memory logical end address" are, respectively, indicative of a start address and an end address that correspond to a logical sector address area from the host.

"Redundancy information" is represented by "1" or "0" regarding whether or not data is redundantly stored in both the disk storage unit 11 (storage disk) and nonvolatile memory unit 12 (multiple nonvolatile memories). Data with high importance, such as FAT data, is redundantly stored in consideration of a failure event.

"Valid/invalid information" is represented by "1" for validity or "0" for invalidity regarding whether or not access to the nonvolatile memory unit 12 (multiple nonvolatile memories) is permitted.

For example, when accessing 2Fh from 20h of a logical sector address, the host side accesses 40002Fh from 40020h of a nonvolatile memory.

Figure 4:
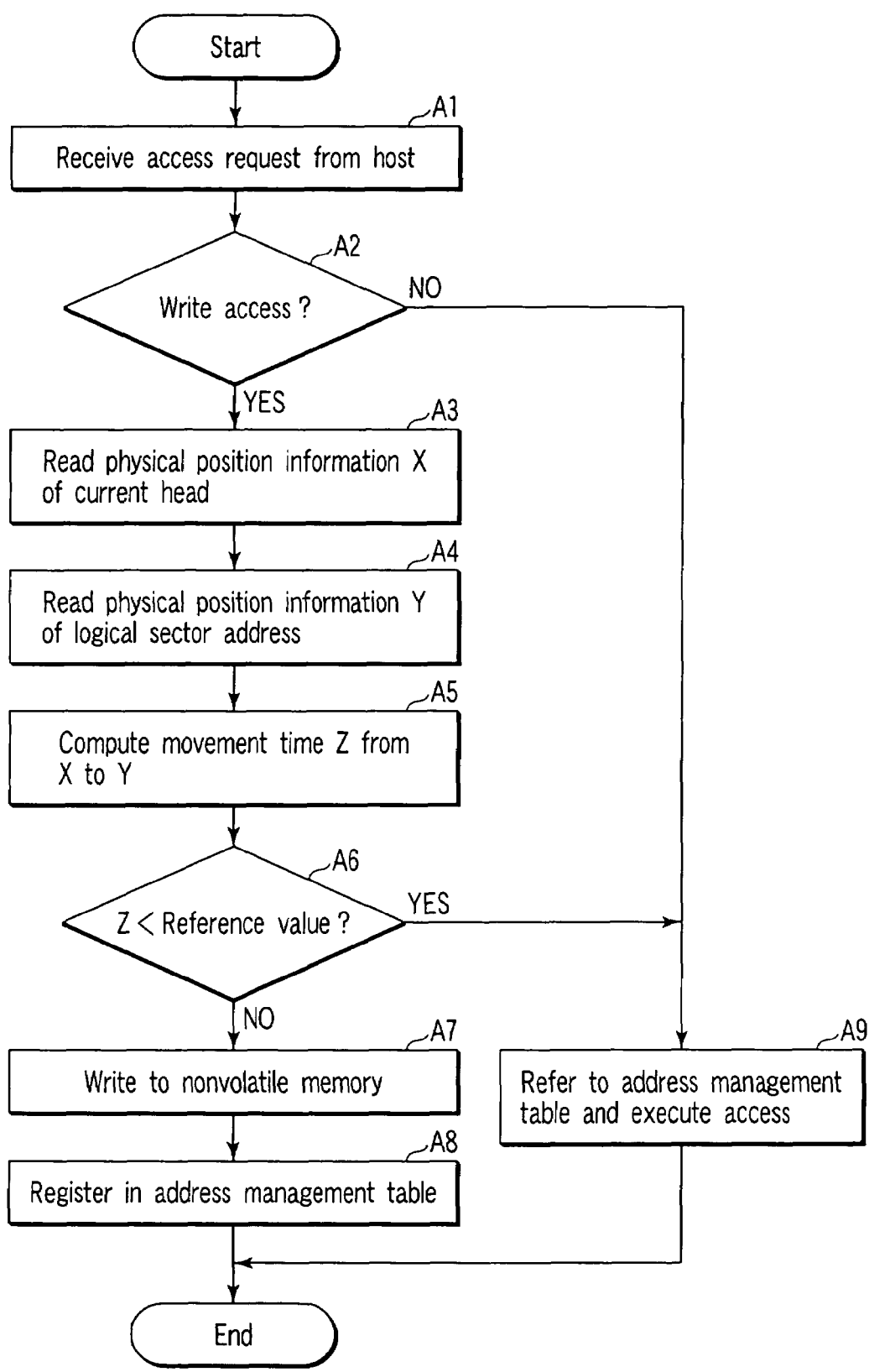
FIG. 4 is a flowchart showing the flow of a process running in response to an access request issued from the host side.

With reference to FIG. 4, the flow of a process running in response to an access request issued from the host side.

The data-transfer controller 15 receives an access request from the host side via the host interface controller 17 (step A1). Subsequently, when having acquired an access-target logical sector address, the data-transfer controller 15 determines whether the access request indicates a read access or a write access (step A2).

If the access request indicates a write access, the data-transfer controller 15 acquires information of a current head physical position X in the disk storage unit 11 (step A3). Then, the data-transfer controller 15 acquires information indicating which one of physical positions Y in the disk storage unit 11 corresponds to the logical sector address read out from the host side (step A4).

Subsequently, the data-transfer controller 15 computes a movement time Z from the position X to the position Y (step A5). Then, the data-transfer controller 15 compares the acquired movement time Z with a reference value held by the selection reference time data holding unit 14 (step A6). If the movement time Z is greater than or equal to the reference value, the data-transfer controller 15 transfers the data to the nonvolatile memory unit 12, thereby controls the nonvolatile memory unit 12 to write data to a nonvolatile memory (step A7). Subsequently, the data-transfer controller 15 registers in the address management table 13 the logical sector address received from the host side and a logical sector address of the nonvolatile memory unit 12 corresponding thereto (step A8).

Figure 5:
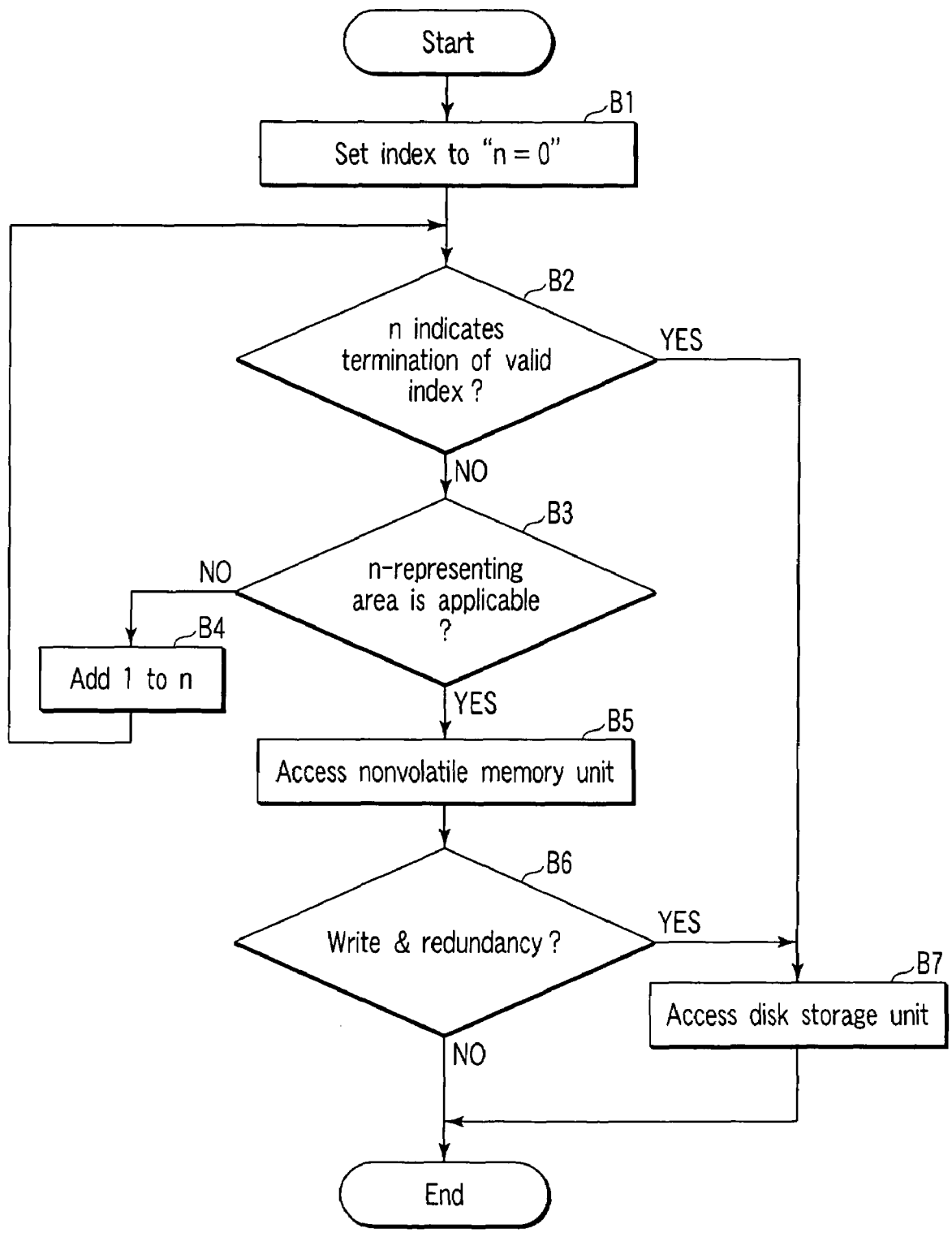
FIG. 5 is a flow diagram showing in detail step A9 shown in FIG. 4.

On the other hand, in step A2, if the access request is determined indicative of a read access, or if in step A6 the movement time Z is determined less than the reference value, the data-transfer controller 15 references the address management table 13 thereby to execute a corresponding access process (step A9). The process in step A9 will now be described in detail below with reference to FIG. 5.

To recognize a target index in the address management table 13, the data-transfer controller 15 counts an index value n by using a predetermined storage area. First, the index value n is initialized to "0" (step B1).

The data-transfer controller 15 determines whether or not valid/invalid information corresponding to the current index indicates the validity (step B2). If the validity is indicated, the data-transfer controller 15 determines whether or not the logical address from the host is included in a sector address area corresponding to the index value n (step B3). If not included therein, the data-transfer controller 15 adds "1" to the current index value, and then proceeds to step B2. If included in the area, the data-transfer controller 15 accesses the nonvolatile memory (step B5).

Next, the data-transfer controller 15 determines whether or not redundancy of the data is indicated in the address management table 13, and concurrently, whether or not the current event is the event of a write access (step B6). If not applicable, the data-transfer controller 15 terminates in that state, whereas if applicable, the data-transfer controller 15 accesses the disk storage unit 11 at the logical sector address (step B7).

In step B2, also in the event that the valid/invalid information indicates the invalidity, the data-transfer controller 15 accesses the disk storage unit 11 at the logical address (step B7).

Figure 6:
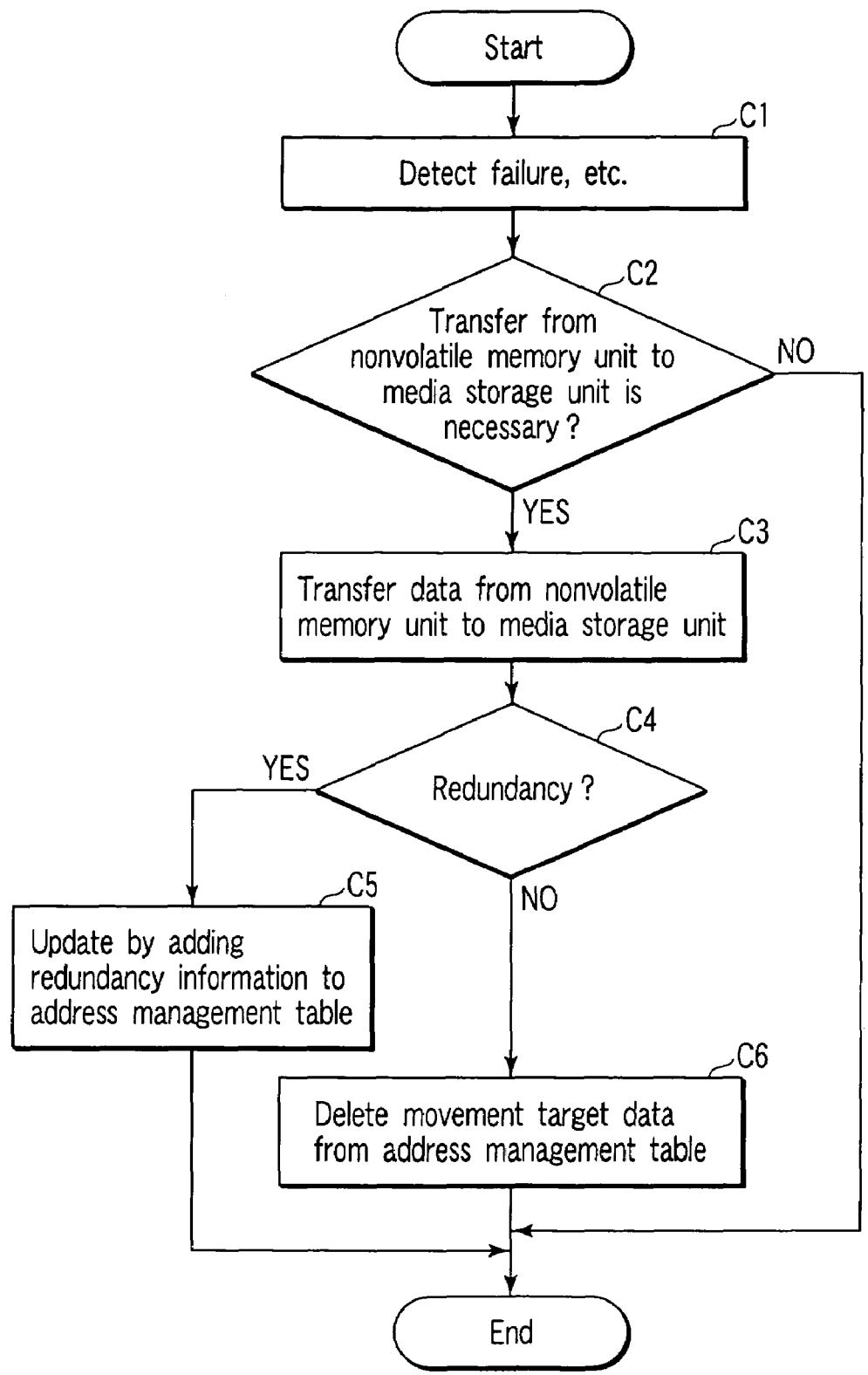
FIG. 6 is a flowchart showing the flow of a process of executing data transfer from a nonvolatile memory unit to a disk storage unit.
Figure 7:
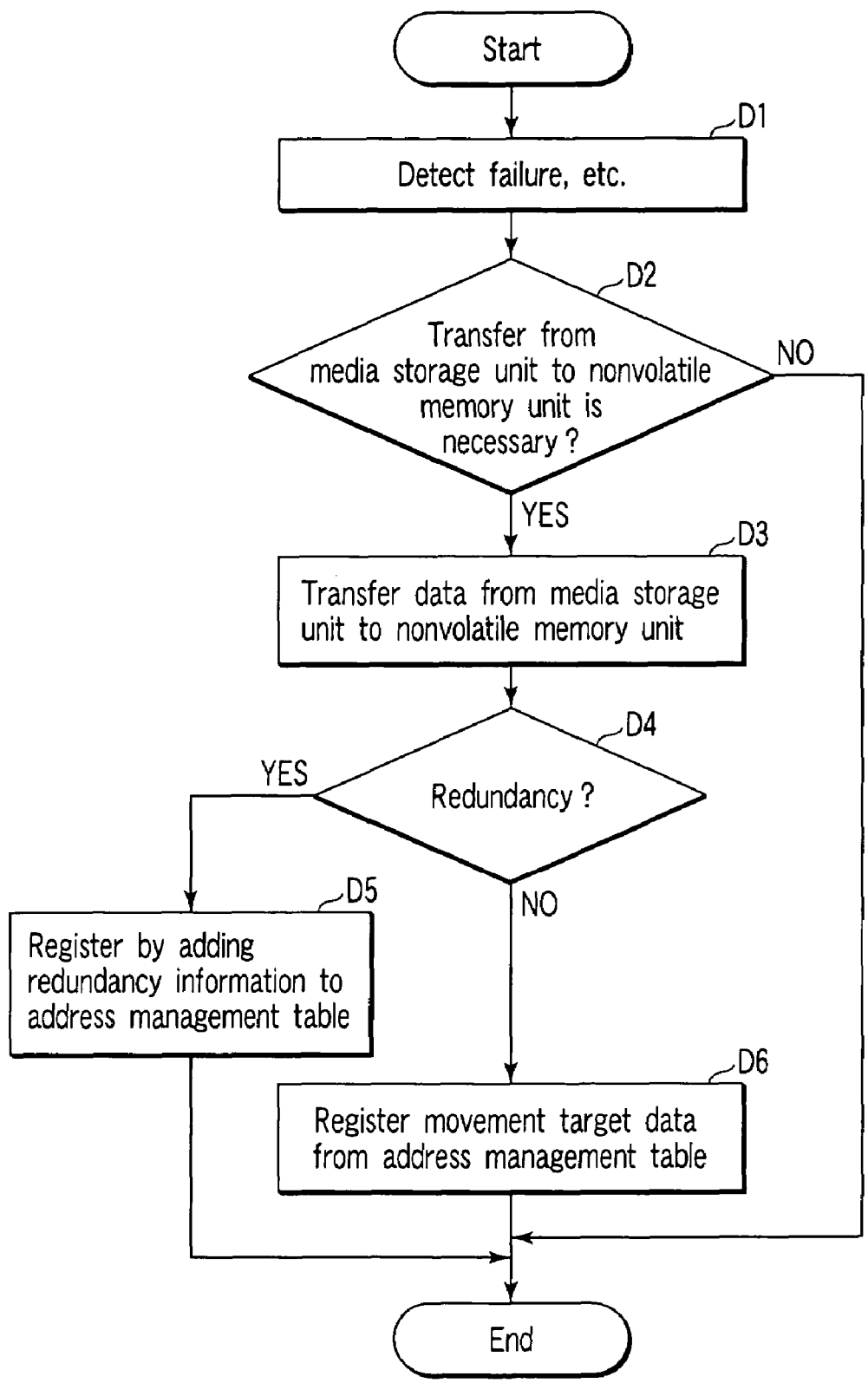
FIG. 7 is a flowchart showing the flow of a process of executing data transfer from the disk storage unit to the nonvolatile memory unit.

With reference to FIGS. 6 and 7, the following describes a case where the data-transfer controller 15 performs the process of data transfer between the disk storage unit 11 (storage disk) and the nonvolatile memory unit 12 (multiple nonvolatile memories). The case is assumed such that FAT data is preliminarily redundantly stored in both the storage units 11 and 12.

FIG. 6 shows the flow of the process of data transfer from the nonvolatile memory unit 12 (multiple nonvolatile memories) to the disk storage unit 11 (storage disk).

With reference to the drawing, upon detection of some failure (step C1), the data-transfer controller 15 determines whether or not data transfer is required to be performed from the nonvolatile memory unit 12 to the disk storage unit 11 (step C2). For example, in an event where FAT data on the storage disk is destructed, the data-transfer controller 15 determines data transfer to be necessary, and executes the data transfer from the nonvolatile memory unit 12 to the disk storage unit 11 (step C3).

The data-transfer controller 15 re-determines whether or not redundancy of the data can be maintained (step C4). If redundancy can be maintained, redundancy information of the data is updated by adding redundancy information to the address management table 13 (step C5). On the other hand, redundancy cannot be maintained, the movement target data is deleted from the address management table 13 (step C6).

FIG. 7 shows the flow of the process of data transfer from the disk storage unit 11 (storage disk) to the nonvolatile memory unit 12 (multiple nonvolatile memories).

With reference to the drawing, upon detection of a failure (step D1), the data-transfer controller 15 determines whether or not data transfer is required to be performed from the disk storage unit 11 to the nonvolatile memory unit 12 (step D2). For example, in an event where FAT data on the nonvolatile memory is destructed, the data-transfer controller 15 determines data transfer to be necessary, and executes the data transfer from the disk storage unit 11 to the nonvolatile memory unit 12 (step D3).

The data-transfer controller 15 re-determines whether or not redundancy of the data can be maintained (step D4). If redundancy can be maintained, redundancy information of the data is updated by adding the redundancy information to the address management table 13 (step D5). On the other hand, redundancy cannot be maintained, the movement target data is registered in the address management table 13 (step D6).

Figure 8:
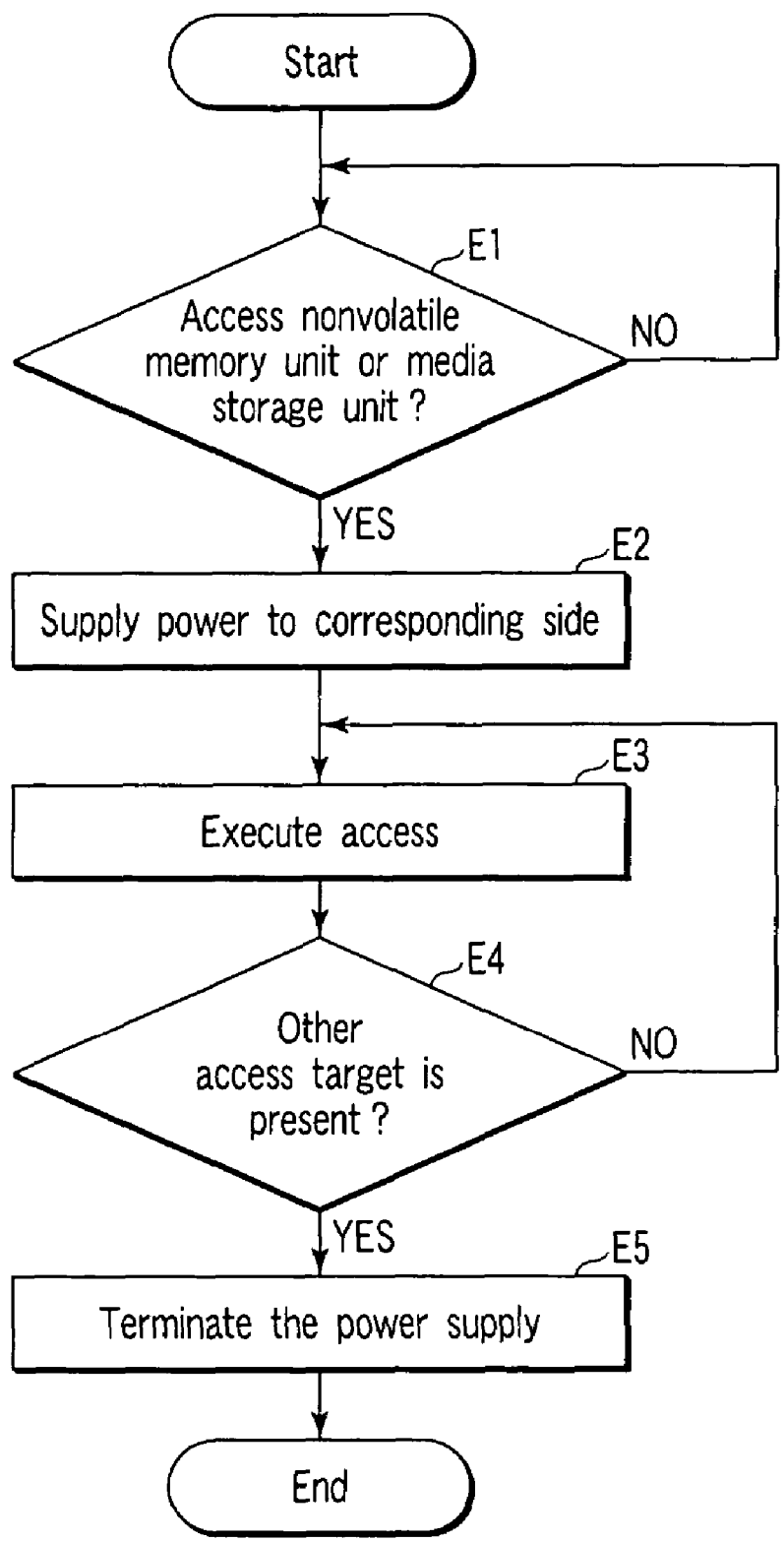
FIG. 8 is a flowchart showing the flow of a power control process by a data-transfer controller and a power controller.

Referring now to FIG. 8, the flow of a power control process by the data-transfer controller 15 and the power controller 16 will be described.

In the event of execution of access to one of the disk storage unit 11 (storage disk) and the nonvolatile memory unit 12 (multiple nonvolatile memories), before the execution of access, the data-transfer controller 15 issues an instruction to the power controller 16 to supply power to corresponding one of the device units (step E1). In response, the power controller 16 supplies power to the corresponding side (step E2). The data-transfer controller 15 then executes the access (step E3). If another access target remains (step E4), access is executed.

Upon termination of the access, the data-transfer controller 15 issues an instruction to the power controller 16 to terminate the power supply to the corresponding device unit. In response, the power controller 16 terminates the power supply to the corresponding side (step E5).

Thus, according to the present embodiment, the write target can be selectively determined to be either one or both of the disk storage unit 11 (storage disk) and the nonvolatile memory unit 12 (multiple nonvolatile memories). In addition, the average value of the overhead time that is increased by, for example, latency and seek time can be resultantly reduced. Further, power saving can be effectively implemented.

According to the present invention, with respect to a storage device having a data-readable/writable storage medium and to an information processing system, the average overhead time can be reduced and data can be efficiently controlled.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage device, comprising:
   a data-readable/writable storage medium;
   a data-readable/writable nonvolatile memory; and
   a controller configured to manage one of respective physical storage areas of the storage medium and the nonvolatile memory as a logical storage area and, in response to an access request from an external source, the controller executes access to either one or both of the storage medium and the nonvolatile memory,
   wherein when a write request for data from an external source is present, the controller performs computation of time necessary for a write of the data to the storage medium, and executes the write to the nonvolatile memory if the computation result is greater than or equal to a predetermined value.

2. The storage device according to claim 1, further comprising an address management table which manages logical addresses corresponding to storage areas of the nonvolatile memory, wherein
   the controller is capable of determining which one of the storage medium and the nonvolatile memory is to be accessed, by referring to the address management table.

3. The storage device according to claim 2, wherein the address management table has information indicating presence or absence of data redundantly stored in both the storage medium and the nonvolatile memory.

4. The storage device according to claim 1, wherein the controller is capable of transferring data between the storage medium and the nonvolatile memory.

5. The storage device according to claim 1, further comprising a power controller which terminates power supply to the storage medium while the storage medium is not being accessed.

6. The storage device according to claim 1, wherein the nonvolatile memory is a flash memory.

7. The storage device according to claim 1, wherein the storage medium is a hard disk.

8. An information processing system, comprising:
   an information processing unit; and
   a storage device connectable to the information processing unit,
   the information processing unit being capable of making a data access request to the storage device, and
   the storage device including:
   a data-readable/writable storage medium,
   a data-readable/writable nonvolatile memory, and
   a controller configured to manage one of respective physical storage areas of the storage medium and the nonvolatile memory as a logical storage area and, in response to the access request from the information processing unit, the controller executes access to either one or both of the storage medium and the nonvolatile memory,
   wherein when a write request for data from an external source is present, the controller performs computation of time necessary for a write of the data to the storage medium, and executes the write to the nonvolatile memory if the computation result is greater than or equal to a predetermined value.

9. The information processing system according to claim 8, wherein the storage device further includes an address management table which manages logical addresses corresponding to storage areas of the nonvolatile memory, and the controller is capable of determining which one of the storage medium and the nonvolatile memory is to be accessed, by referring to the address management table.

10. The information processing system according to claim 9, wherein the address management table has information indicating presence or absence of data redundantly stored in both the storage medium and the nonvolatile memory.

11. The information processing system according to claim 8, wherein the controller is capable of transferring data between the storage medium and the nonvolatile memory.

12. The information processing system according to claim 8, further comprising a power controller which terminates power supply to the storage medium while the storage medium is not being accessed.

* * * * *